United States Patent
Simone et al.

(10) Patent No.: US 11,904,332 B2
(45) Date of Patent: Feb. 20, 2024

(54) FLAME COATING MACHINE AND METHOD

(71) Applicant: SAIPEM S.P.A., San Donato Milanese (IT)

(72) Inventors: Francesco Simone, San Donato Milanese (IT); Catalin Petrache, San Donato Milanese (IT)

(73) Assignee: SAIPEM S.P.A., San Donato Milanese (IT)

( * ) Notice: Subject to any disclaimer, the term of this patent is extended or adjusted under 35 U.S.C. 154(b) by 301 days.

(21) Appl. No.: 17/287,050

(22) PCT Filed: Oct. 23, 2019

(86) PCT No.: PCT/IB2019/059074
§ 371 (c)(1),
(2) Date: Apr. 20, 2021

(87) PCT Pub. No.: WO2020/054526
PCT Pub. Date: Apr. 30, 2020

(65) Prior Publication Data
US 2021/0354158 A1 Nov. 18, 2021

(30) Foreign Application Priority Data
Oct. 23, 2018 (IT) .......................... 102018000009713

(51) Int. Cl.
*B05B 12/00* (2018.01)
*B05B 13/04* (2006.01)
(Continued)

(52) U.S. Cl.
CPC ............ *B05B 12/004* (2013.01); *B05B 7/201* (2013.01); *B05B 13/0436* (2013.01); *B05D 1/08* (2013.01); *F16L 58/181* (2013.01)

(58) Field of Classification Search
None
See application file for complete search history.

(56) References Cited

U.S. PATENT DOCUMENTS 5,186,755 A * 2/1993 Carlson, Jr. ......... B05B 13/0436
118/323
6,626,376 B1 * 9/2003 Rose .................... B05B 13/0436
118/316

(Continued)

OTHER PUBLICATIONS

Notification Concerning Submission, Obtention or Transmittal of Priority Document for International Application No. PCT/IB2019/059074 dated Feb. 7, 2020.

(Continued)

*Primary Examiner* — Binu Thomas
(74) *Attorney, Agent, or Firm* — Neal, Gerber & Eisenberg LLP

(57) ABSTRACT

A flame coating machine for coating field joints of a pipeline has a flame spray system having two flame spray units configured for heating and/or coating with a thermoplastic polymer an annular junction portion and two annular end portions of an existing coating delimiting the annular junction portion; a control system having two temperature sensors configured for acquiring temperature values along the surface collectively defined by the annular junction portion and the annular end portions, and a control unit configured for actuating the flame spray unit in a polymer flame spraying mode or in a flame heating mode as a function of the detected temperature values and at least one threshold value.

9 Claims, 4 Drawing Sheets

(51) Int. Cl.
   *B05B 7/20*   (2006.01)
   *B05D 1/08*   (2006.01)
   *F16L 58/18*  (2006.01)

(56) References Cited

U.S. PATENT DOCUMENTS

| | | |
|---|---|---|
| 9,789,505 B2 | 10/2017 | Kimpel, Jr. et al. |
| 10,166,715 B2 | 1/2019 | Kaltchev |
| 2004/0083957 A1* | 5/2004 | Latvis ................. B05B 13/0436 |
| | | 118/620 |
| 2012/0272897 A1* | 11/2012 | Bamford ............. B05B 13/0436 |
| | | 118/500 |
| 2016/0236401 A1* | 8/2016 | Kaltchev ............. B29C 66/1122 |
| 2016/0281203 A1* | 9/2016 | Giovannini ............. B05B 7/205 |
| 2018/0264499 A1* | 9/2018 | Simone ............... B05B 13/0436 |
| 2021/0276040 A1* | 9/2021 | Giovannini ......... B05B 13/0436 |

OTHER PUBLICATIONS

International Search Report and Written Opinion for International Application No. PCT/IB2019/059074 dated Jan. 24, 2020.

* cited by examiner

FLAME COATING MACHINE AND METHOD

PRIORITY CLAIM

This application is a national stage application of PCT/IB2019/059074, filed on Oct. 23, 2019, which claims the benefit of and priority to Italian Patent Application No. 102018000009713, filed on Oct. 23, 2018, the entire contents of which are each incorporated by reference herein.

TECHNICAL FIELD

A flame coating machine for coating field joints of a pipeline.

BACKGROUND

The pipelines for transporting hydrocarbons are composed of sections of pipe that are joined together. Each section of pipe usually comprises a metal cylinder, generally made of steel, on which a protective coating made of polymer material is applied, which has the function of protecting the metal pipe. Optionally, the pipe may have an additional external coating made of gunite or concrete, the function of which is to weigh down the pipeline. Two end lengths of the section of pipe are uncoated so that the steel cylinders can be welded together. Each uncoated end is referred to as a "cutback" in the language generally used in this technical sector.

The joining operation of the pipe sections, which can be carried out both in ground installations and in ships for laying submarine pipelines, involves welding the steel cylinders, generally in several welding passes. Once a welding ring has been made between two steel cylinders, an annular junction portion formed from two adjacent "cutbacks" and, therefore, uncoated straddles the weld. As a result, during the assembly, the pipeline has, in sequence, a plurality of annular junction portions, each of which is formed from two uncoated lengths placed next to each other and welded together. A joint coating must be made at each annular junction portion before laying the pipeline. The definition "Field Joint" identifies both the operation of joining the sections of pipe in the laying field of the pipeline itself and the area straddling the pipes made at the head of the laying.

The making and application in the field of the joint coating at one annular junction portion is in practice called "Field Joint Coating" and involves preparing the surface of the annular junction portion and coating it with polymer materials. "Field Joint Coating" also identifies the joint coating made in the field.

In more detail, in accordance with certain practices, the application of a field joint coating involves a plurality of operations on each annular junction portion in accordance with the following sequence:
- grind the annular junction portion to remove impurities and oxidations from the surface of the annular junction portion and to give a certain roughness to that surface;
- heat the annular junction portion to facilitate the subsequent steps in the application of polymer materials;
- apply a relatively thin, so-called "primer" layer of polymer material, in particular epoxy resin, directly to the annular junction portion;
- apply a relatively thin layer of polymer material with adhesive properties over the previous layer; and
- apply a relatively thick layer (thicker than the previous layers, in any case), generally known as the "top coat", to the adhesive layer.

The adhesive polymer material and the polymer material for making the "Top Coat" are selected from compatible materials for making a union by fusion.

The operations described are particularly critical when performed on a pipeline during assembly onboard a pipeline-laying ship because the space available is limited and the pipeline, during assembly, is partially laid on the bed of a water body and cannot rotate about its longitudinal axis. In addition, the field joint coating must meet certain quality requirements such as perfect adhesion to the pipeline and to the ends of the existing coating. It must also guarantee a minimum thickness that varies as a function of the application and the customer's requirements.

A technique for the application of the "Top Coat", known as flame coating or "Thermal Spray" or "Flame Spray", involves the use of at least one flame spray unit, which integrates the functions of polymer material powder, in particular polypropylene powder (CMPP), mixer and polymer flame material applicator. In more detail, the powders are fused via the combustion of a gas jet to form droplets that are expelled through a high-speed nozzle and impact the surface of the pipeline that causes the rapid deformation and solidification of the droplets. On impact, the liquid polypropylene droplets with the classic elongated shape are transformed into solid thin sheets that accumulate and stratify until they reach the desired thickness of the "Top Coat". The system can use liquefied petroleum gas (LPG) as a fuel and polypropylene powder as a polymer material.

The flame coating process has many advantages including the application to substrates in the 135° C. to 180° C. temperature range; the ability to follow curved and tapered shapes; and the thermal and shear strength properties that are superior to those of other technologies.

However, in the case of "Field Joint Coating", the "Top Coat", in addition to covering the annular junction portion, must overlap and closely adhere to two end portions in polymer material of the existing coating of the pipeline that delimit the annular junction portion on opposite sides. The flame application of the "Top Coat" is therefore critical because the polymer material is applied to two substrates with different physical, chemical, and temperature characteristics that could result in the "Top Coat's" relatively poor adhesion to the substrates.

SUMMARY

The purpose of the present disclosure is to provide a flame coating machine for coating field joints of a pipeline capable of mitigating certain of the drawbacks of certain of the prior art.

According to the present disclosure, a flame coating machine is provided for coating field joints of a pipeline, the machine comprising a flame spray system comprising at least one flame spray unit configured to heat and/or coat with a thermoplastic polymer an annular junction portion and two annular end portions of an existing coating delimiting the annular junction portion; a control system comprising at least one temperature sensor configured to acquire temperature values along the surface collectively defined by the annular junction portion and the annular end portions, and a control unit configured to actuate the flame spray unit in polymer flame spraying mode or in flame heating mode as a function of the temperature values detected and at least one threshold value. In this way, the application of the flame coating is only carried out when the surface temperature is at an optimal value so as to ensure perfect adhesion of the polymer material both to the annular junction portion and to the annular end portions.

In particular, the control system comprises position sensors to acquire and control the position of the flame spray unit and the temperature sensor with respect to said surface. In this way, the control system controls the movements along the surface and tracks the position of the flame spray unit along the surface and the position of the temperature sensor.

In particular, the control unit comprises a microprocessor configured to associate each acquired temperature value with an area of said surface, and to compare each temperature value with a respective threshold value associated with said area. In this way, the control system recognises which areas need more heating to raise the temperature of these areas to predetermined values. In particular, the areas defined by the annular end portions must be raised to a temperature that results in their surface fusion.

In particular, the temperature sensor is a pyrometer or a thermal chamber to enable the surface temperature to be detected remotely.

According to one embodiment of the disclosure, the machine comprises at least one guide system configured to selectively clamp the pipeline near an annular junction portion and to advance the flame spray unit and the temperature sensor along an annular path and a linear path so as to coat said surface. In this way, the movements of the spray unit and the temperature sensor are controlled with reference to the pipeline.

In particular, the machine comprises two flame spray units and two temperature sensors. Such a configuration simplifies the machine operations and halves the cycle times.

In particular, the guide system comprises a main frame selectively clampable to the pipeline; a rotor selectively rotatable with respect to the main frame and around the pipeline; and a carriage that is moveable along the rotor parallel to the rotation axis of the rotor. In this way, the carriage is moveable along the entire surface.

In particular, the carriage comprises a frame and two supports, each of which is arranged at 180° to the other around the carriage's rotation axis and is configured to support a spray unit and a temperature sensor. In this way, the composition of rotor oscillations of 180° and the translation of the carriage along the rotor enable the internal surface to be coated.

In particular, each support is adjustable in a radial direction along the frame with respect to the rotor's rotation axis. In this way, the flame spray unit can be arranged at the optimal distance from the surface and this distance can be adjusted as a function of the diameter of the pipeline.

In particular, the flame spray system comprises a fuel supply device and a polymer supply device for supplying the fuel and the polymer respectively to at least one flame spray unit.

Another purpose of the present disclosure is to provide a flame coating method for coating field joints of a pipeline that does not entail certain of the drawbacks of certain of the prior art.

According to the present disclosure, a flame coating method is provided for coating field joints of a pipeline, the method comprising the following steps:
heating and/or coating an annular junction portion and two annular end portions of an existing coating delimiting the annular junction portion with a thermoplastic polymer by a flame spray unit;
acquiring temperature values along the surface jointly defined by the annular junction portion and the annular end portions; and
operating the flame spray unit in polymer flame spraying mode or in flame heating mode as a function of the temperature values detected and at least one threshold value.

Such a configuration provides that it is possible to selectively heat and apply the spray coating as required.

BRIEF DESCRIPTION OF THE FIGURES

Additional characteristics and advantages of the present disclosure will become clear from the following description of its embodiments, with reference to the accompanying figures, wherein.

DETAILED DESCRIPTION

Figure 1:
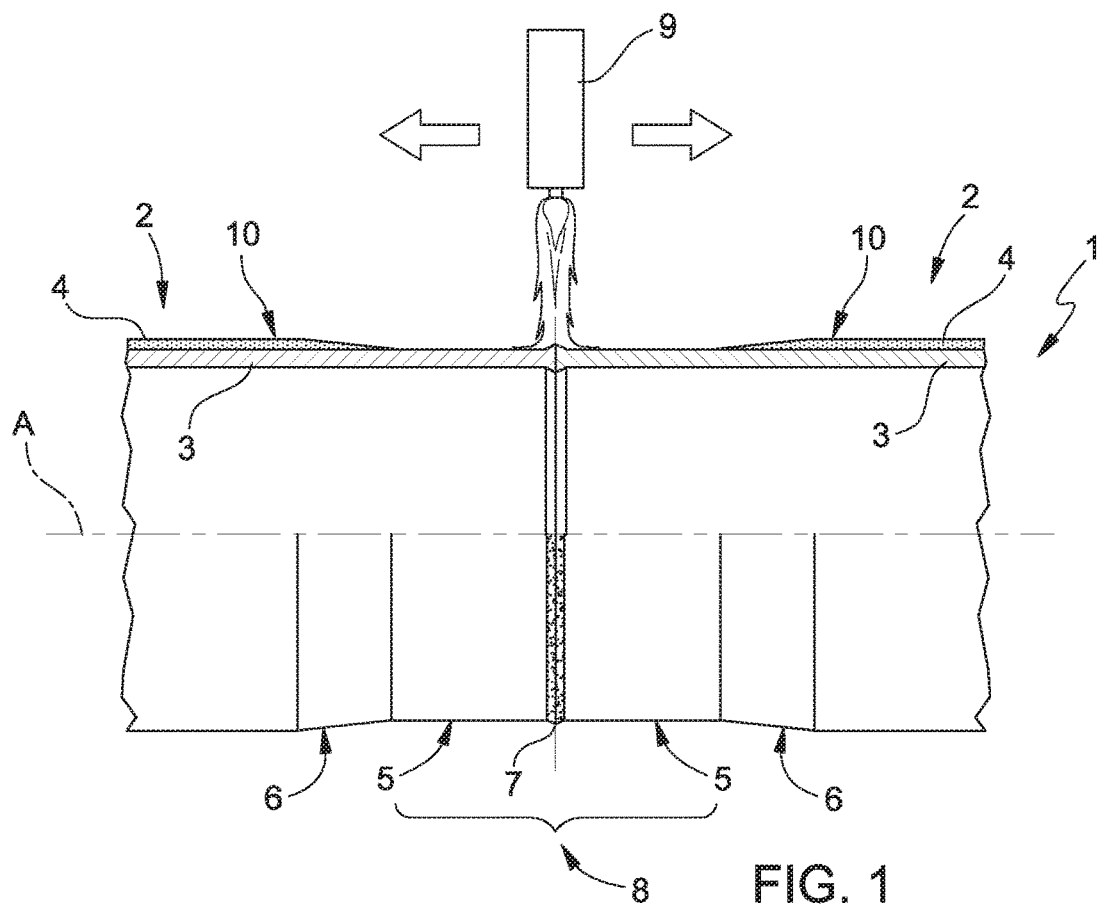
FIG. 1 is an elevated lateral view, with parts in cross-section and parts removed for clarity, of a pipeline to which a polymer material is applied with a flame spray unit.
Figure 2:
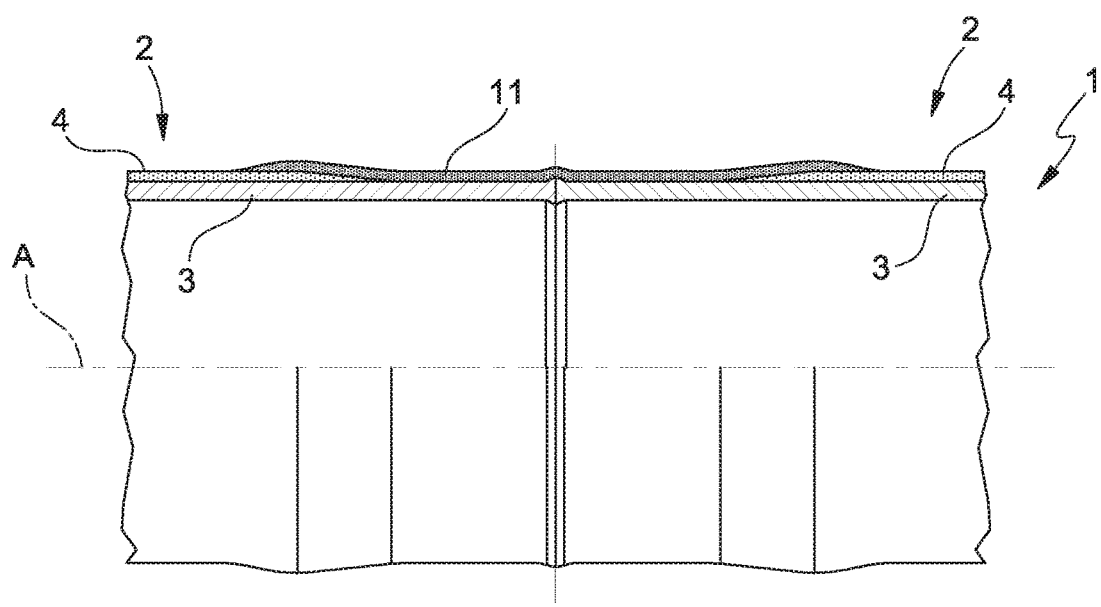
FIG. 2 is an elevated lateral view, with parts shown in cross-section and parts removed for clarity, of the pipeline in FIG. 1 and provided with a field joint coating.

In FIGS. 1 and 2, the number 1 indicates a pipeline as a whole, which extends along a longitudinal axis A. In the case shown in FIG. 1, the pipeline 1 comprises two sections of pipe 2 aligned along the longitudinal axis A and joined together. Each pipe section 2 comprises a metal cylinder 3; a coating 4 made of polymer material, generally polyethylene or polypropylene, which is arranged in contact with the metal cylinder 3 and has the function of protecting the metal cylinder 3 from corrosion.

Each section of pipe 2 has two opposite uncoated ends 5 (only one of which is shown in FIG. 1), which have a chamfer 6. Two successive sections of pipe 2, which are aligned along the longitudinal axis A, are arranged with the uncoated ends 5 facing each other and they are welded together, possibly in several welding passes, so as to make an annular weld seam 7 between the two sections of pipe 2. The two sections of welded pipe 2 define an annular junction portion 8, which extends along the longitudinal axis A between the two chamfers 6 of the coating 4 and comprises the annular weld seam 7.

In general, the repetition of the joints of sections of pipe 2 makes it possible to make the pipeline 1. With reference to the present description, pipeline 1 is also understood to mean the pipeline under construction consisting, for example, of only two sections of pipe 2 joined together.

The joining of the sections of pipe 2 also involves, in addition to the welding of the metal cylinders 3, the making of a seamless coating of the existing coatings 4. This operation involves applying a polymer material by a flame spray unit 9 around and along the annular junction portion 8 and around and along two annular end portions 10 of the coating 4.

The application of the polymer material generally requires operations to prepare the face of the annular junction portion 8 and of the end portions 10, in order to facilitate the adhesion of a field joint coating 11 (FIG. 2). These operations consist in cleaning, for example, via blasting, and in heating, for example by induction, the annular junction portion 8.

Prior to the application of the field joint coating 11 (FIG. 2), a thin layer of polymer material, in particular epoxy material, can be applied to the annular junction portion, which has the function of a primer, as well as a layer of polymer adhesive.

The flame spray unit 9 is guided along an axis parallel to the longitudinal axis A and along the plane defined by that longitudinal axis A so as to repeatedly "wipe" the whole surface on which the polymer material has to be applied.

With reference to FIG. 2, a field joint coating 11 is shown, which has been made by progressive addition until reaching the required thickness and covering/adhering to the annular junction portion 8 and to the annular end portions 10.

Figure 3:
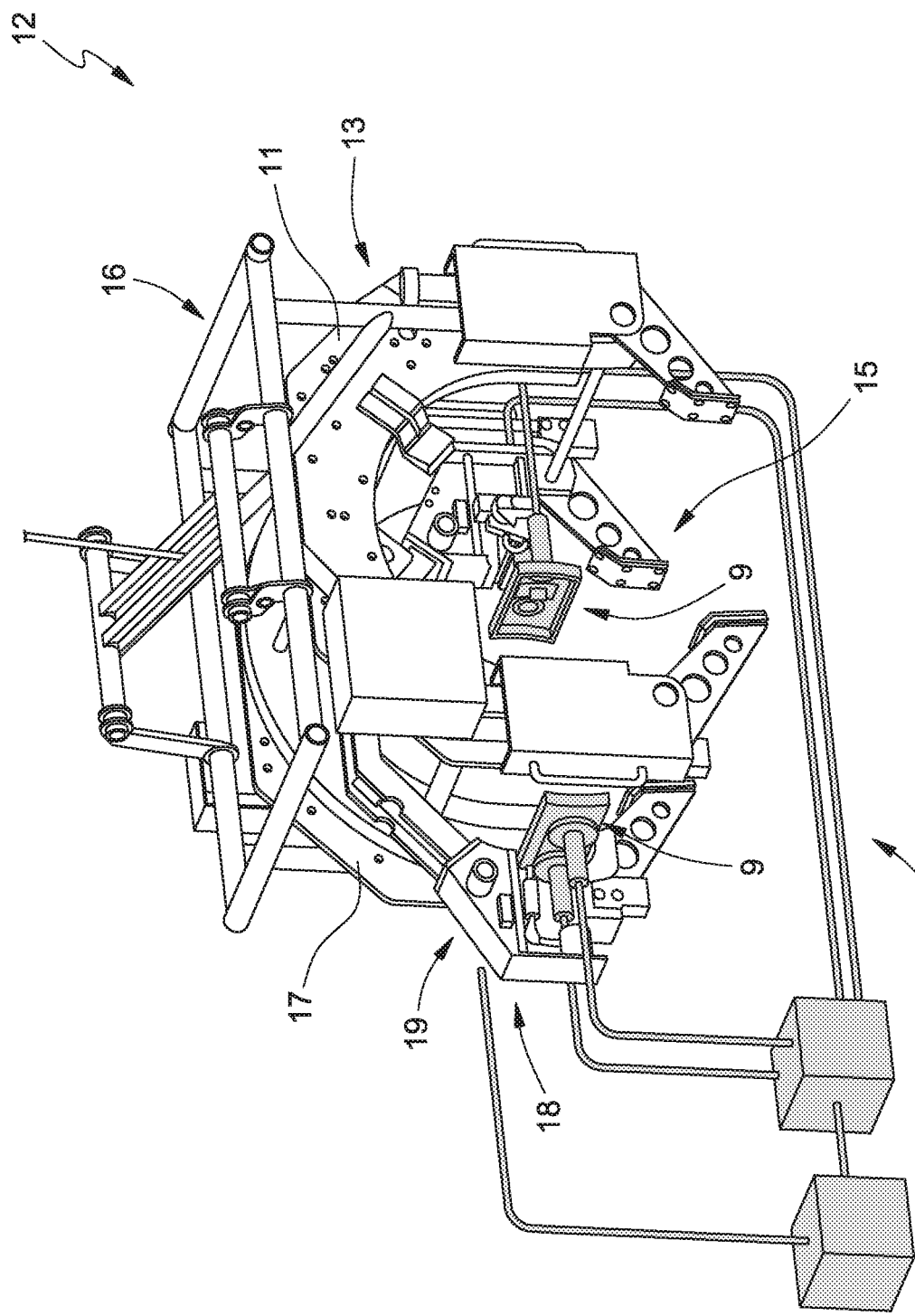
FIG. 3 is a perspective view, with parts removed for clarity and parts in cross-section, of a flame coating machine made in accordance with the present disclosure.

With reference to FIG. 3, the number 12 indicates a flame coating machine configured to make the field joint coating 11 (FIG. 2). The machine 12 comprises a guide system 13 configured to be clamped to the pipeline 1 (FIG. 1) and to guide one or more flame spray units 9 along the annular junction portion 8 and the annular end portions 10 (FIG. 1); a flame spray system 14 configured to feed fuel and polymer powder material to the spray unit 9; and a control system 15 configured to control the position of the flame spray unit 9 and the operating status of the flame spray unit 9.

The guide system 13 comprises a frame 16 that can be clamped to the pipeline 1 and comprising two U-shaped structures 17 facing each other and configured to be arranged, in use, on the sides opposite an annular junction portion (FIG. 1); a rotor 18, which is supported in a rotatable manner by the frame and by the two U-shaped structures 17; and a carriage 19, which is guided along the rotor 18.

Figure 4:
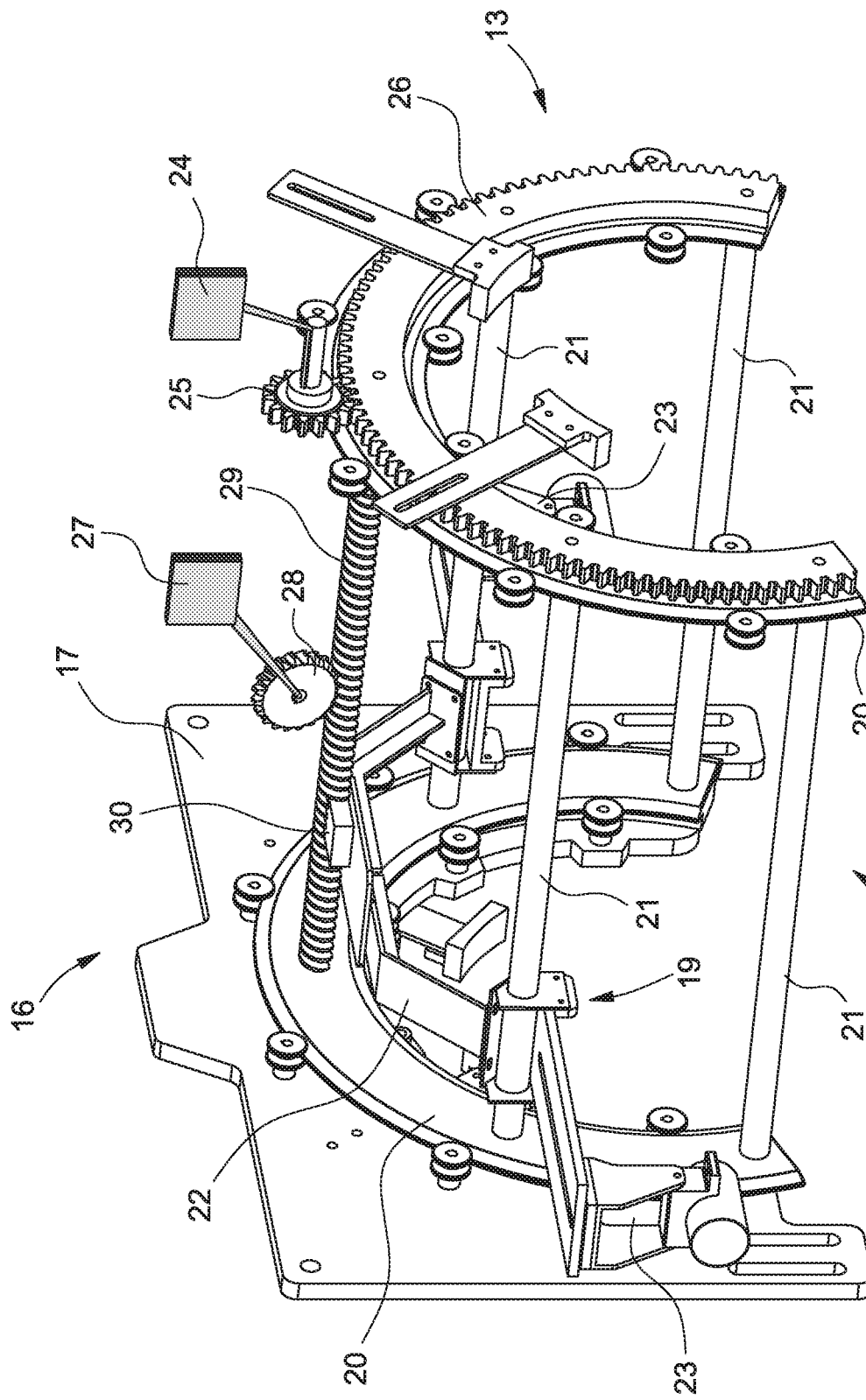
FIG. 4 is a perspective view, with parts removed for clarity and on an enlarged scale, of the machine in FIG. 3.

With reference to FIG. 4, the rotor 18 is shaped like an open cylindrical cage so that the rotor 18 can be arranged around the pipeline 1 (FIG. 1) via radial access together with the frame 16. In more detail, the rotor 18 comprises two annular arch-shaped sliders 20, which are facing and parallel to each other, which extend for a circular arch greater than 180°, and which are guided by their respective U-shaped structures 17, only one of which is shown in FIG. 3; and bars 21 which connect the sliders 20 to each other.

The carriage 19 is mounted to slide along at least two bars 21 and comprises a frame 22; and, in the example shown, two supports 23, each of which is configured to house a flame spray unit 9 (FIG. 1) and is adjustable with respect to the frame 22 in a transverse direction to the bars 21 and substantially radial when the guide system 13 is coupled to the pipeline 1 (FIG. 1). In the example shown, the two supports 23 are arranged at 180° from each other.

The guide system 13 also comprises an actuator 24 configured to rotate the rotor 18 via a transmission comprising a sprocket 25 and a toothed annular sector 26 coupled to one of the sliders 20; and an actuator 27 configured to advance the carriage 19 along the rotor 18 by a transmission comprising a worm gear 28; a worm screw 29; and a nut 30 associated with the carriage 19.

Figure 5:
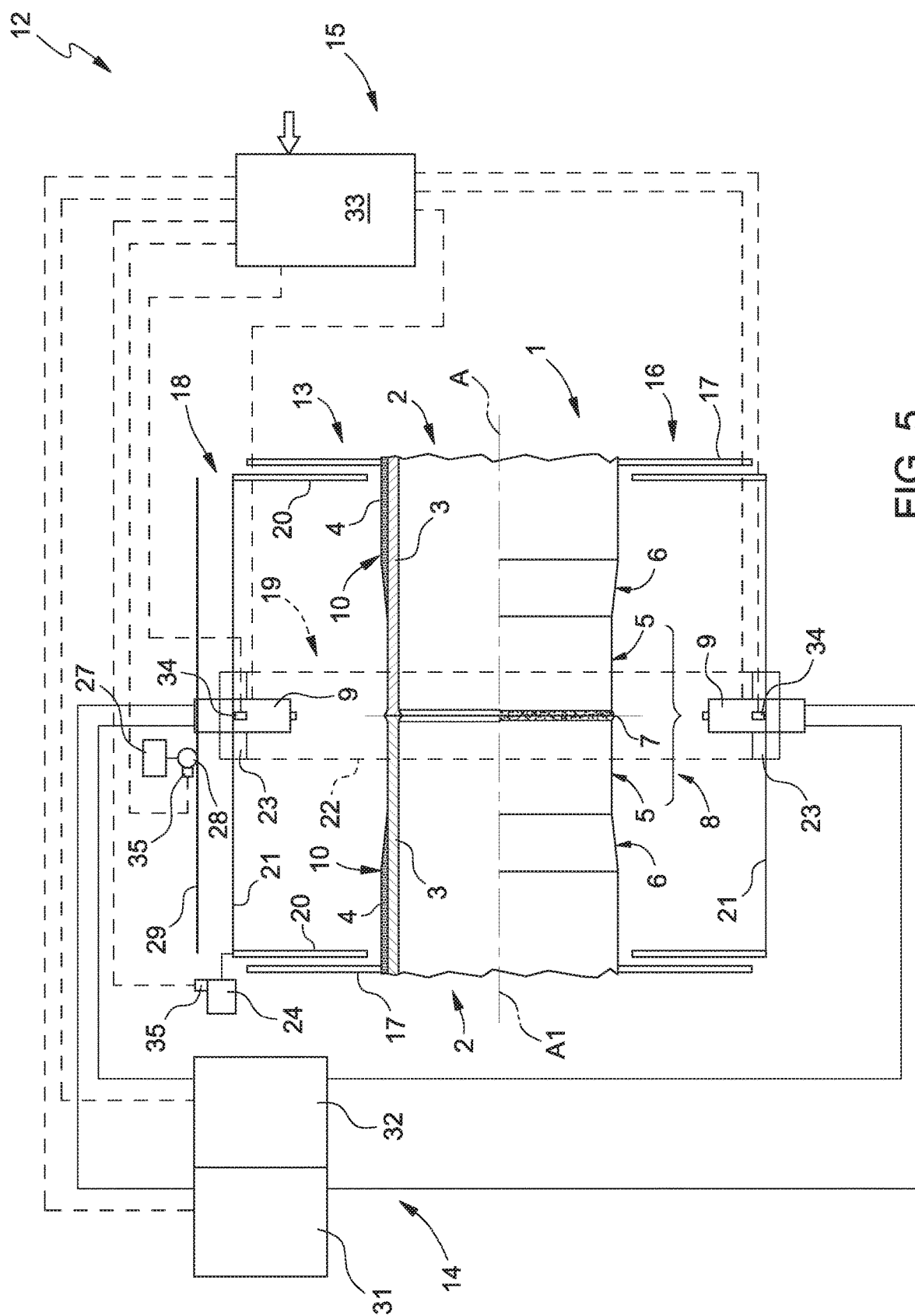
FIG. 5 is a schematic view, with parts in cross-section and parts removed for clarity, of the machine in FIG. 3 coupled to a pipeline as shown in FIG. 1.

With reference to FIG. 5, the machine 12 is clamped to the pipeline in such a way that the rotation axis A1 of the rotor 18 essentially coincides with the longitudinal axis A of the pipeline 1.

The flame spray system 14, in addition to the above-mentioned flame spray units 9, comprises a fuel supply device 31 and a polymer supply device 32. Generally, the fuel is LPG and the polymer polypropylene powder.

The spray system 14 is a product available on the market, such as, for example, those made by the company IBIX S.r.l. La Viola no. 4,I-48022 Santa Maria in Fabriago, Lugo (RA), Italy.

With reference to FIG. 5, the control system 15 comprises a control unit 33 configured to control the operating parameters of the guide system 13 and the flame spray system 14; temperature sensors 34 configured to detect the external surface temperature of the pipeline 1; position sensors 35 to detect the position of the carriage 19 and the flame spray units 9.

In practice, the control unit 33 controls the guide system 13, the flame spray system 14 and the interactions between the guide system 13 and the flame spray system 14.

The control unit 33 comprises a microprocessor configured to compare input data with predefined parameters, process the data, and emit signals for monitoring the guide system 13 and flame spray system 14. In particular, the flame spray system 14 has a rest state and two operating states: a first operating state involves emitting only the flame for heating a surface, while a second operating state involves emitting the flame together with the polymer to make a coating via the flame spray system 14. The control system 15 selects the rest state and one of the two operating states of the flame spray system 14 as a function of the temperature detected by the temperature sensors 34 and the reference parameters.

In more detail, the temperature sensors 34 are configured to detect the surface temperature of the annular junction portion 8 and the annular end portions 10 and can be pyrometers or cameras mounted on supports 23. The actuators 24 and 27 enable temperature sensors 34 to be arranged on the whole surface collectively defined by the annular junction portion 8 and by the annular end portions 10, while the position sensors 35, which enable a particular area of the surface to be associated with a corresponding temperature value acquired by the temperature sensors 34. In this case, the position sensors can be encoders associated with the actuators 24 and 27.

The microprocessor compares the temperature values with the threshold values: if the temperature values of an area on the surface are below certain threshold values, a signal is emitted that activates one or more flame spray units 9 in the flame-only operating state to heat the area where the temperature does not meet the temperature requirements to proceed with the application of the flame coating.

If, on the other hand, the whole surface that has to be coated meets the temperature requirements, then the flame spray system 14 is set to the operating state of the flame polymer application.

The threshold values may vary as a function of the area of the surface, particularly as a function of whether the surface is defined by the annular junction portion 8 or by the annular end portions 10.

The spray units 9 are guided by the guide system 13 along a path that results from the combination of an annular path determined by the rotation of the rotor 18 around the pipeline 1 and by a linear path of the carriage 19 along the rotor 18. The combination of the annular path and the linear path enables the annular junction portion 8 and the annular end portions 10 to be fully coated.

In the case shown, the machine 12 comprises two flame spray units 9 mounted on the carriage 19 and arranged at 180° to each other. As a result, 180° rotations of the rotor 18 are sufficient to coat the whole annular surface.

The supports 23 are adjustable in the radial direction and can adapt the machine 12 to the diameter of the pipeline 1 and, in particular, to enable the positioning of the flame spray units 9 at a distance determined by the surface so that the flame is always at the optimal distance of use from the surface.

The present disclosure extends to additional variants which are not explicitly described and which fall within the scope of protection of the claims. That is, the present disclosure also covers embodiments that are not described in the detailed description above as well as equivalent embodiments that are part of the scope of protection set forth in the claims. Accordingly, various changes and modifications to the presently disclosed embodiments will be apparent to those skilled in the art.

The invention claimed is:

1. A flame coating machine configured to coat a field joint of a pipeline, the flame coating machine comprising:
   a flame spray system comprising a flame spray unit configured to at least one of: (i) heat an annular junction portion and two annular end portions of an applied coating that delimits the annular junction portion, and (ii) coat the annular junction portion and the two annular end portions with a thermoplastic polymer; and
   a control system comprising:
      a temperature sensor configured to acquire a plurality of temperature values along a surface defined by the annular junction portion and the two annular end portions,
      a control unit configured to actuate, based on the acquired temperature values and at least one threshold value, the flame spray unit in one of: a polymer flame spraying mode and a flame heating mode,
      a first position sensor configured to acquire a position of the flame spray unit with respect to the surface, and
      a second position sensor configured to acquire a position of the temperature sensor with respect to the surface.

2. The flame coating machine of claim 1, wherein the control unit comprises a microprocessor configured to associate each acquired temperature value to an area of the surface, and compare each temperature value with a respective threshold value associated with that area of the surface.

3. The flame coating machine of claim 1, wherein the temperature sensor is one of a pyrometer and a thermal imaging camera.

4. The flame coating machine of claim 1, further comprising a guide system selectively clampable to the pipeline within a designated distance of the annular junction portion and configured to advance the flame spray unit and the temperature sensor along an annular path and a linear path to cover the surface.

5. The flame coating machine of claim 4, further comprising two flame spray units and two temperature sensors.

6. The flame coating machine of claim 5, wherein the guide system comprises:
   a main frame selectively clampable to the pipeline;
   a rotor selectively rotatable with respect to the main frame and about the pipeline; and
   a carriage moveable along the rotor parallel to an axis of rotation of the rotor.

7. The flame coating machine of claim 6, wherein the carriage comprises a frame and two supports arranged at 180° apart about the axis of rotation of the rotor, each support configured to support one of the flame spray units and one of the temperature sensors.

8. The flame coating machine of claim 7, wherein each support is adjustable in a radial direction along the main frame with respect to the axis of rotation of the rotor.

9. The flame coating machine of claim 1, wherein the flame spray system comprises a fuel supply device configured to supply a fuel to the flame spray unit and a polymer supply device configured to supply the thermoplastic polymer to the flame spray unit.

* * * * *